US012246806B2

(12) United States Patent
Takatsuka et al.

(10) Patent No.: US 12,246,806 B2
(45) Date of Patent: Mar. 11, 2025

(54) EVALUATION DEVICE, EVALUATION METHOD, AND NAVIGATION CONTROL DEVICE

(71) Applicant: Sony Group Corporation, Tokyo (JP)

(72) Inventors: Susumu Takatsuka, Tokyo (JP); Hiroki Tetsukawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 238 days.

(21) Appl. No.: 17/921,980

(22) PCT Filed: Mar. 22, 2021

(86) PCT No.: PCT/JP2021/011767
§ 371 (c)(1),
(2) Date: Oct. 28, 2022

(87) PCT Pub. No.: WO2021/246027
PCT Pub. Date: Dec. 9, 2021

(65) Prior Publication Data
US 2023/0174206 A1 Jun. 8, 2023

(30) Foreign Application Priority Data
May 30, 2020 (JP) .................................. 2020-095144

(51) Int. Cl.
*B63C 11/48* (2006.01)
*B63B 49/00* (2006.01)
*G01V 9/00* (2006.01)

(52) U.S. Cl.
CPC .............. *B63C 11/48* (2013.01); *B63B 49/00* (2013.01); *G01V 9/00* (2013.01)

(58) Field of Classification Search
CPC ......... B63C 11/48; B63B 49/00; B63B 35/00; G01V 9/00; G01V 9/02; G06N 20/00
See application file for complete search history.

(56) References Cited

U.S. PATENT DOCUMENTS

2022/0276148 A1* 9/2022 Yamane ............ G01N 15/1456
2023/0174206 A1* 6/2023 Takatsuka ............... B63B 49/00
367/131

FOREIGN PATENT DOCUMENTS

| CN | 107729953 A | | 2/2018 | |
| CN | 115698775 A | * | 2/2023 | ............. B63B 49/00 |

(Continued)

OTHER PUBLICATIONS

Benjamin J Phrampus et al: "A Global Probabilistic Prediction of Cold Seeps and Associated SEAfloor Fluid Expulsion Anomalies (SEAFLEAs)", G3: Geochemistry, Geophysics, Geosystems, Wiley Blackwell Publishing, Inc, US vol. 21, No. 1, Jan. 7, 2020 (Jan. 7, 2020), page n/a, XP072300881, ISSN: 1525-2027, DOI: 10.1029/2019GC008747.

(Continued)

*Primary Examiner* — Daniel Pihulic
(74) *Attorney, Agent, or Firm* — XSENSUS LLP

(57) ABSTRACT

An evaluation device according to the present technology includes an evaluation computing unit that learns to obtain deposit evaluation data as an output by machine learning using at least one of ocean topography data or fine particle component measurement data for a known seabed deposit as input data for learning, the evaluation computing unit calculating the deposit evaluation data for an evaluation target sea area by using at least one of the ocean topography data or the fine particle component measurement data for the evaluation target sea area as an input.

10 Claims, 10 Drawing Sheets

(56) References Cited

FOREIGN PATENT DOCUMENTS

| | | | | |
|---|---|---|---|---|
| DE | 112020003977 T5 | * | 5/2022 | ......... G01N 15/1429 |
| EP | 4159613 A1 | * | 4/2023 | ............ B63B 49/00 |
| JP | 2011-13209 A | | 1/2011 | |
| JP | 2011-158343 A | | 8/2011 | |
| JP | 2019-90839 A | | 6/2019 | |
| JP | 2020-56254 A | | 4/2020 | |
| JP | 7508353 B2 | * | 7/2024 | |
| WO | WO-2018198586 A1 | * | 11/2018 | ............ G01N 15/14 |
| WO | WO-2018216623 A1 | * | 11/2018 | |
| WO | WO-2021246027 A1 | * | 12/2021 | ............ B63B 49/00 |

OTHER PUBLICATIONS

Bing Han et al: "Hydrothermal plume simulation for autonomous hydrothermal vent discovery", Oceans, 2012—Yeosu, IEEE, May 21, 2012 (May 21, 2012), pp. 1-7, XP032219446, DOI: 10.1109/0CEANS-YEOSU.2012.6263527 ISBN: 978-1-4577-2089-5.

Yoshino Soichi et al: "Towards in-situ chemical classification of seafloor deposits: Application of neural networks to underwater laser induced breakdown spectroscopy", Oceans 2017—Aberdeen, IEEE, Jun. 19, 2017 (Jun. 19, 2017), pp. 1-5, XP033236606.

International Search Report and Written Opinion mailed on May 18, 2021, received for PCT Application PCT/JP2021/011767, Filed on Mar. 22, 2021, 9 pages including English Translation.

\* cited by examiner

EVALUATION DEVICE, EVALUATION METHOD, AND NAVIGATION CONTROL DEVICE

CROSS-REFERENCE TO RELATED APPLICATIONS

The present application is based on PCT filing PCT/JP2021/011767, filed Mar. 22, 2021, which claims priority to JP 2020-095144, filed May 30, 2020, the entire contents of each of which are incorporated herein by reference.

TECHNICAL FIELD

The present technology relates to a technical field of an evaluation device and a method thereof for making an evaluation regarding a seabed deposit, and a navigation control device that performs navigation control for deposit exploration on the basis of the evaluation regarding the seabed deposit.

BACKGROUND ART

For example, as disclosed in Patent Document 1 below, various technologies for exploration of a seabed deposit have been proposed.

CITATION LIST

Patent Document

Patent Document 1: Japanese Patent Application Laid-Open No. 2011-158343

SUMMARY OF THE INVENTION

Problems to be Solved by the Invention

Here, in deposit exploration, improvement of exploration efficiency is desired. This is because a low exploration efficiency leads to an increase in the number of navigation days, resulting in an increase in cost required for exploration.

Furthermore, in conventional deposit exploration, exploration (acoustic survey) by a sound Doppler method is often performed for rough deposit position estimation. In this acoustic survey, for example, a wave motion is emitted from a research ship or the like by using an air gun, and sound wave measurement is performed to analyze reflection from the seabed. However, the possibility that this wave motion would adversely affect the ecology of zooplankton such as larvae of krill or copepods which serve as prey for fishes, and a risk of environmental destruction is considered.

The present technology has been made in view of the above circumstances, and an object thereof is to reduce the risk of environmental destruction while reducing the cost related to deposit exploration.

Solution to Problems

An evaluation device according to the present technology includes an evaluation computing unit that learns to obtain deposit evaluation data as an output by machine learning using at least one of ocean topography data or fine particle component measurement data for a known seabed deposit as input data for learning, the evaluation computing unit calculating the deposit evaluation data for an evaluation target sea area by using at least one of the ocean topography data or the fine particle component measurement data for the evaluation target sea area as an input.

The ocean topography data means topography data regarding the ocean, such as data indicating a seabed topography in a certain sea area or data indicating a coastline topography. Furthermore, the fine particle component measurement data means data obtained by measurement of fine particle components performed on seawater, and examples of the fine particle component measurement data include microorganism data which is measurement data regarding microorganisms such as plankton, bacteria, and the like in seawater, electrical conductivity, temperature, potential of hydrogen (pH), gas concentrations of specific gases such as methane, hydrogen, helium, and the like, metal concentrations of specific metals such as manganese, iron, and the like in seawater, and the like. Furthermore, the deposit evaluation data is data indicating evaluation regarding a seabed deposit, and examples thereof include a deposit existence probability indicating an existence probability of a deposit, a hydrothermal plume probability indicating a probability that a measurement point is in a hydrothermal plume, an estimated ore type indicating a type of ore that may exist in the deposit, and the like.

According to the above configuration, it is possible to improve evaluation accuracy by using artificial intelligence (AI) as a computing unit for making an evaluation regarding a seabed deposit.

Furthermore, by causing the evaluation computing unit as described above to calculate deposit evaluation data, it is possible to realize a survey with less risk of environmental destruction in place of an acoustic survey in evaluating a deposit in an evaluation target sea area.

In the evaluation device according to the present technology described above, it is conceivable that the evaluation computing unit is configured to learn to output the deposit existence probability as the deposit evaluation data.

As a result, in the case of evaluating the deposit existence probability in the evaluation target sea area, it is possible to improve evaluation accuracy. Furthermore, in evaluating the deposit existence probability, a survey with less risk of environmental destruction in place of an acoustic survey is realized.

In addition, the deposit existence probability can be used as an evaluation index for an action taken in deposit exploration.

In the evaluation device according to the present technology described above, it is conceivable that the evaluation computing unit is configured to learn to output a hydrothermal plume probability as the deposit evaluation data by machine learning using at least fine particle component measurement data for a known seabed deposit as input data for learning.

The hydrothermal plume probability can be used as an evaluation index for an action taken in deposit exploration.

In the evaluation device according to the present technology described above, it is conceivable that the evaluation computing unit is configured to learn to output a non-buoyant plume probability as the hydrothermal plume probability.

The non-buoyant plume probability is information indicating a probability that the measurement point is in a non-buoyant plume in a hydrothermal plume. This non-buoyant plume probability can be used as an evaluation index for an action taken in deposit exploration.

In the evaluation device according to the present technology described above, it is conceivable that the evaluation computing unit is configured to learn to output a buoyant plume probability as the hydrothermal plume probability.

The buoyant plume probability is information indicating a probability that the measurement point is in a buoyant plume in a hydrothermal plume. This buoyant plume probability can be used as an evaluation index for an action taken in deposit exploration.

In the evaluation device according to the present technology described above, it is conceivable that the evaluation computing unit is configured to learn to obtain deposit evaluation data as an output by machine learning using ocean topography data and fine particle component measurement data for a known seabed deposit as input data for learning.

It is possible to improve the accuracy of deposit evaluation data by using learning based on a plurality of input elements regarding a seabed deposit.

In the evaluation device according to the present technology described above, it is conceivable that the evaluation computing unit is configured to learn to output the hydrothermal plume probability by machine learning using fine particle component measurement data for a known seabed deposit and measurement location data indicating a measurement point as input data for learning.

Examples of the measurement location data include data indicating latitude and longitude and data indicating the water depth. The accuracy of the hydrothermal plume probability can be improved by learning using not only the fine particle component measurement data but also such measurement location data in combination.

An evaluation method according to the present technology is an evaluation method including calculating deposit evaluation data for an evaluation target sea area by inputting at least one of ocean topography data or fine particle component measurement data for the evaluation target sea area to an evaluation computing unit that learns to obtain the deposit evaluation data as an output by machine learning using at least one of the ocean topography data or the fine particle component measurement data for a known seabed deposit as input data for learning.

Also by such an evaluation method, the effects similar to those of the evaluation device according to the present technology described above can be obtained.

Furthermore, a navigation control device according to the present technology includes an evaluation computing unit that learns to obtain deposit evaluation data as an output by machine learning using at least one of ocean topography data or fine particle component measurement data for a known seabed deposit as input data for learning, and a control information generation unit that generates navigation control information which is control information regarding navigation on the basis of the deposit evaluation data for an evaluation target sea area by using at least one of the ocean topography data or the fine particle component measurement data for the evaluation target sea area as an input.

As a result, in a case where navigation control information for deposit exploration is generated on the basis of deposit evaluation data, since AI is used as the computing unit for evaluation, it is possible to make a highly accurate evaluation as evaluation regarding a seabed deposit.

Furthermore, according to the above configuration, it is possible to realize a survey with less risk of environmental destruction in place of an acoustic survey in calculating the deposit evaluation data.

In the navigation control device according to the present technology described above, it is conceivable that the evaluation computing unit is configured to learn to output a hydrothermal plume probability as the deposit evaluation data by machine learning using at least fine particle component measurement data for a known seabed deposit as input data for learning, and the control information generation unit is configured to generate the navigation control information on the basis of the hydrothermal plume probability output by the evaluation computing unit by using at least the fine particle component measurement data for the evaluation target sea area as an input.

As a result, it is possible to generate navigation control information by using the hydrothermal plume probability as an action evaluation index in navigation.

It is conceivable that the navigation control device according to the present technology described above includes as the evaluation computing unit, an evaluation computing unit that learns to output a non-buoyant plume probability and an evaluation computing unit that learns to output a buoyant plume probability, in which the control information generation unit generates the navigation control information for increasing the non-buoyant plume probability in a case where the non-buoyant plume probability is a predetermined value or less, and generates the navigation control information for increasing the buoyant plume probability in a case where the non-buoyant plume probability exceeds the predetermined value and the buoyant plume probability is a predetermined value or less.

As a result, it is possible to guide a device which is a navigation control target stepwise from the outside of a hydrothermal plume to the inside of a non-buoyant plume and from the inside of the non-buoyant plume to the inside of a buoyant plume.

In the navigation control device according to the present technology described above, it is conceivable that the control information generation unit is configured to generate the navigation control information by reinforcement learning based on the deposit evaluation data.

As a result, it is possible to generate navigation control information for maximizing an evaluation value (reward) for an action.

MODE FOR CARRYING OUT THE INVENTION

Hereinafter, the embodiments will be described in the following order.

<1. First Embodiment>
[1-1. Regarding seabed deposit]
[1-2. Configuration of evaluation system]
[1-3. First example]
[1-4. Second example]
<2. Second Embodiment>
<3. Modifications>
[3-1. First modification]
[3-2. Second modification]
[3-3. Other modifications]
<4. Summary of Embodiments>
<5. Present Technology>

1. First Embodiment

[1-1. Regarding Seabed Deposit]

Figure 1:
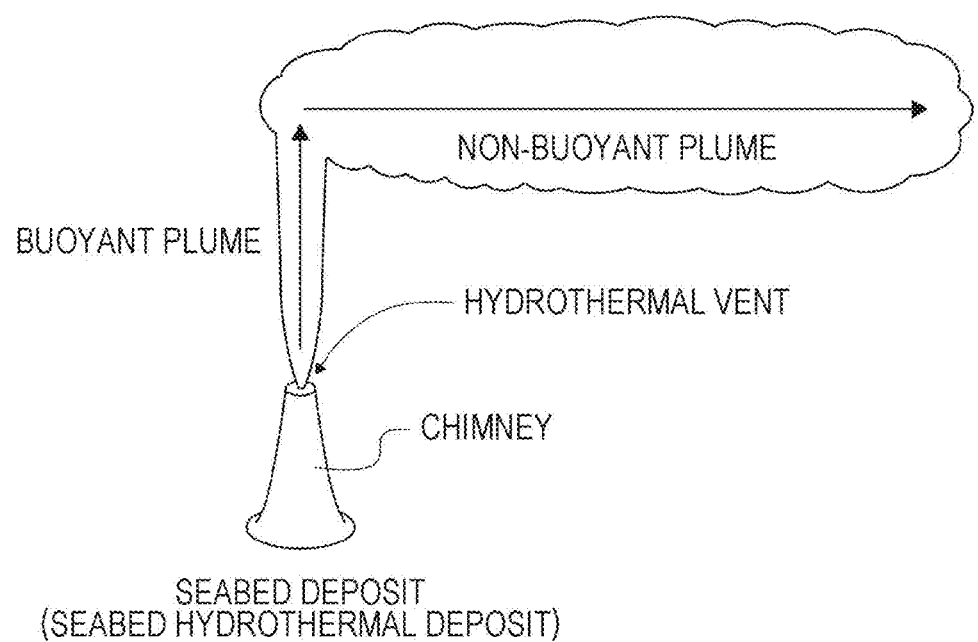
FIG. 1 is an explanatory view of a seabed deposit.

First, a seabed deposit will be described with reference to FIG. 1.

A seabed deposit (also referred to as a seabed hydrothermal deposit) is a deposit formed by precipitation of minerals as copper, lead, zinc, gold, silver, rare metals, or the like in a process in which seawater that has penetrated a deep portion of the underground is heated by heat of magma or the like and jetted into the sea.

In the vicinity of a seabed deposit, there is a special ecosystem using a hydrothermal vent as an energy supply source, unlike the sea surface that depends on photosynthesis based on solar energy. Hydrothermal water jetted from the hydrothermal vent contains a high concentration of sulfides, and bacteria called sulfur bacteria synthesize and discharge carbohydrates from the sulfides. In addition, living organisms that can survive without using solar energy gather in the vicinity of a seabed deposit and form an ecosystem different from that on the ground by symbiosis with the sulfur bacteria as a primary producer in the body or on the body surface or predation of the sulfur bacteria.

As illustrated, the hydrothermal vent is formed at a top portion of a chimney raised from the seabed, and hydrothermal water from the hydrothermal vent rises from the hydrothermal vent and spreads like a mushroom cloud. Such a water mass affected by the hydrothermal water is called a hydrothermal plume.

In seawater in the hydrothermal plume, there is a food chain from chemically-synthesized bacteria as primary producers to plankton that preys on the chemically-synthesized bacteria, and further to fishes that feed on the plankton.

The hydrothermal plume has characteristics such as a higher water temperature, a lower potential of hydrogen (pH), and a higher electrical conductivity although slightly compared to normal seawater at the same water depth not affected by hydrothermal water. Furthermore, it has been found that the microbial cell density also increases in the hydrothermal plume as well as various chemical components, and it has been revealed that the microbial cell density increases up to several times compared to that in the surrounding seawater. Therefore, by examining these characteristics, it is possible to estimate existence or nonexistence of a hydrothermal plume, and it is possible to conduct a survey of a seabed deposit (primary exploration for roughly searching a sea area).

The hydrothermal water jetted into the seawater from the hydrothermal vent rises until the density becomes equal to that of the surrounding seawater, and then spreads in the horizontal direction on a deep current. In the hydrothermal plume, a plume rising in seawater is called a "buoyant plume", and a plume spreading in the horizontal direction is called a "non-buoyant plume".

[1-2. Configuration of Evaluation System]

Figure 2:
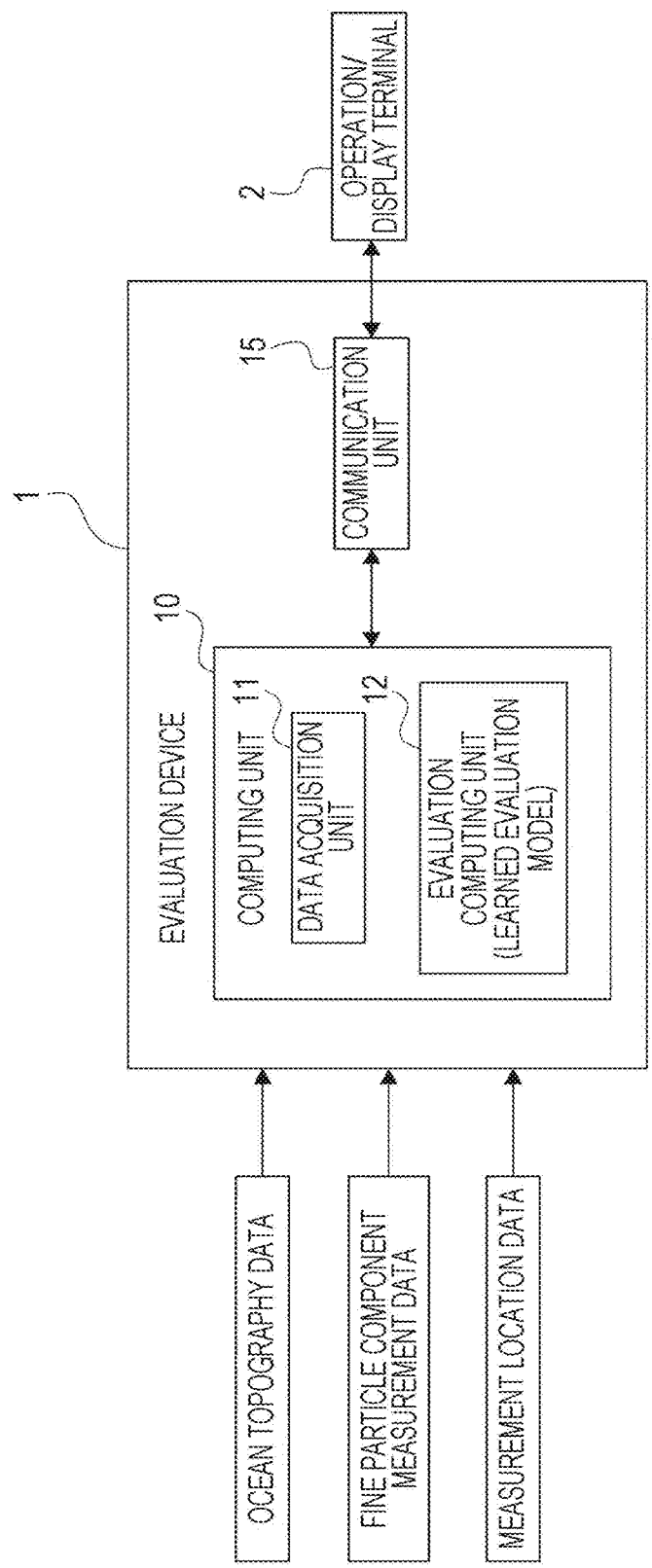
FIG. 2 is a diagram illustrating a configuration example of an evaluation system as a first embodiment.

FIG. 2 is a diagram illustrating a configuration example of an evaluation system as a first embodiment for making an evaluation regarding a seabed deposit.

As illustrated, the evaluation system includes an evaluation device 1 and an operation/display terminal 2.

The evaluation device 1 includes a computing unit 10 and a communication unit 15. The computing unit 10 has a configuration of including, for example, a microcomputer including a central processing unit (CPU), a read only memory (ROM), and a random access memory (RAM), and performs various computations and control for realizing various operations of the evaluation device 1. The communication unit 15 performs data communication with an external device, particularly the operation/display terminal 2 in the present example.

The operation/display terminal 2 is a device that receives an operation input for various operation instructions to the evaluation device 1, transmits operation input information to the evaluation device 1, and displays received information from the evaluation device 1, and an example thereof is a personal computer (PC), a tablet terminal, a smartphone, or the like.

The computing unit 10 has functions as a data acquisition unit 11 and an evaluation computing unit 12.

The evaluation computing unit 12 computes deposit evaluation data for an evaluation target sea area by using at least one of the ocean topography data or the fine particle component measurement data for the evaluation target sea area as an input. The data acquisition unit 11 is a functional unit that acquires input data to the evaluation computing unit 12.

Here, the ocean topography data means topography data related to the ocean, such as data indicating a seabed topography in a certain sea area or data indicating a coastline topography.

Furthermore, the fine particle component measurement data means data obtained by measurement of the fine particle component performed on seawater.

Examples of the fine particle component measurement data include microorganism data that is measurement data regarding microorganisms such as plankton, bacteria, and the like in seawater, and water quality data that is measurement data (excluding measurement regarding microorganisms) related to water quality of seawater, such as electrical conductivity, temperature, pH, and the like in seawater.

Examples of the microorganism data include the number, type, size, and the like of microorganisms that have been measured. Here, the size may be a plurality of types of data such as a size in the minimum direction and a size in the maximum direction, or a size in the thickness direction.

Examples of the water quality data include gas concentrations of specific gases such as methane, hydrogen, helium, and the like, and metal concentrations of specific metals such as manganese, iron, and the like, in addition to the electrical conductivity, temperature, and pH described above.

Here, the fine particle component measurement data is associated with measurement location data that is data indicating the measurement point. The measurement location data includes latitude and longitude data and water depth data.

The deposit evaluation data is data indicating evaluation regarding a seabed deposit, and examples thereof include a deposit existence probability indicating an existence probability of a deposit, a hydrothermal plume probability indicating a probability that the measurement point is in a hydrothermal plume, an estimated ore type indicating the type of ore that may exist in the deposit, and the like.

The evaluation computing unit 12 includes an evaluation model (learned evaluation model) learned to obtain deposit evaluation data as an output by machine learning using at least one of ocean topography data or fine particle component measurement data for a known seabed deposit as input data for learning, and calculates deposit evaluation data for a sea area which is an evaluation target (hereinafter referred to as "evaluation target sea area" by using at least one of the ocean topography data or the fine particle component measurement data for the evaluation target sea area as an input. In the present example, since the measurement location data is associated with the fine particle component measurement data, in a case where the fine particle component measurement data is used as the input data, the measurement location data is also used as the input data.

In the first embodiment, an example (first example) in which the evaluation computing unit 12 calculates the deposit existence probability as deposit evaluation data and an example (second example) in which the evaluation computing unit 12 calculates the estimated ore type as deposit evaluation data will be described.

[1-3. First Example]

The first example will be described.

Here, an example in which the evaluation computing unit 12 calculates the deposit existence probability by using ocean topography data, fine particle component measurement data, and measurement location data associated with the fine particle component measurement data as input data for evaluation as will be described.

Figure 3:
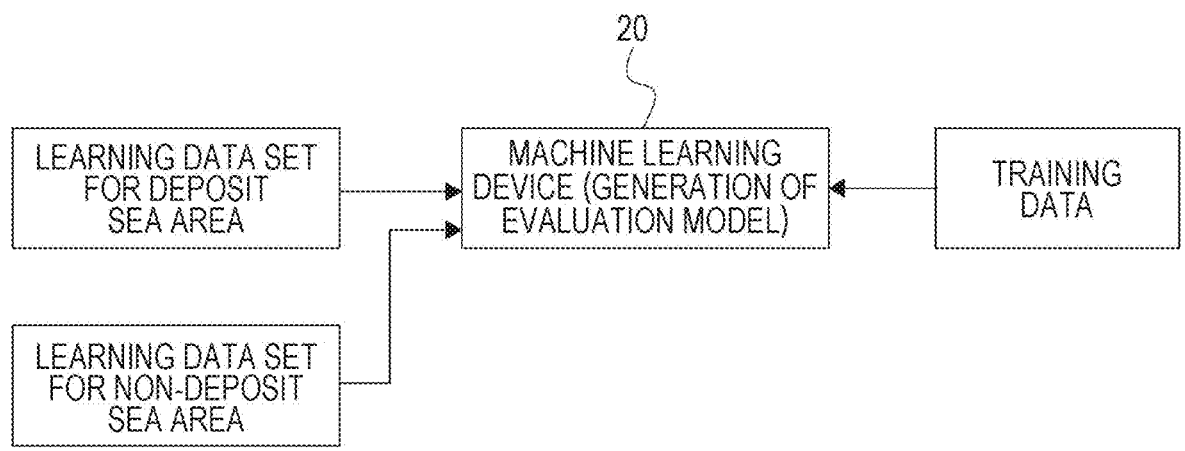
FIG. 3 is a diagram for describing an example of a machine learning method for generating an evaluation model in the first embodiment.

An example of a machine learning method for generating an evaluation model in the evaluation computing unit 12 will be described with reference to FIG. 3.

First, a machine learning device 20 is used for learning. In the present example, a machine learning device compatible with supervised learning is used as the machine learning device 20.

As an input data set for learning, a learning data set for a deposit sea area and a learning data set for a non-deposit sea area are used. Here, the deposit area means a sea area in which existence of a seabed deposit is confirmed, and the non-deposit sea area means a sea area in which non-existence of a seabed deposit is confirmed.

As described above, in the present example, since the ocean topography data, the fine particle component measurement data, and the measurement location data are used as inputs, the ocean topography data, the fine particle component measurement data of the deposit sea area, and the measurement location data are used as the learning data set for the deposit sea area. In addition, as a learning data set for the non-deposit sea area, ocean topography data and fine particle component measurement data of the non-deposit sea area, and measurement location data are used.

In this case, as training data, data indicating existence or non-existence of a seabed deposit is used as a ground truth label of learning data. That is, in a case where learning data for a deposit sea area is input as input data for learning, data indicating the presence of a seabed deposit (that is, deposit existence probability=100%) is provided as training data for the machine learning device 20, and in a case where learning data for a non-deposit sea area is input as input data for learning, data indicating the absence of a seabed deposit (that is, the deposit existence probability=0%) is provided as training data for the machine learning device 20.

By machine learning using the learning data set for the deposit sea area and the non-deposit sea area and the training data as described above, the machine learning device 20 can generate an evaluation model using the ocean topography data, the fine particle component measurement data, and the measurement location data as inputs to obtain the deposit existence probability as an output.

Note that the machine learning here can be realized using a machine learning engine that handles a known supervised regression problem. As an example, the machine learning can be realized by using a learning engine of logistic regression which is often used as a learning engine for predicting the probability of occurrence of one specific event from a plurality of factors.

Here, it has been found that in the hydrothermal plume described above, the content of nutrient salts serving as feed for plankton to be measured, minerals affecting the growth of microorganisms, and the like is characteristic. Furthermore, in the hydrothermal plume, since the species and density of microorganisms are unique, it is known that an ecological environment in the hydrothermal plume is different from that in other sea areas. It is considered that the characteristic ecological environment in the hydrothermal plume affects the outside of the hydrothermal plume due to the food chain or the sea current. By taking statistics of this relationship by machine learning, it is possible to estimate the deposit existence probability in the evaluation sea area only by using the fine particle component measurement data to be described later in the surface layer of the sea surface and the intermediate and deep layer without submerging to the deep sea, and to perform safer, more efficient, and lower-cost exploration of seabed resources in terms of environmental conservation as compared with the conventional acoustic survey.

The evaluation model obtained by the machine learning device 20 conducting the machine learning as described above is used as the evaluation model of the evaluation computing unit 12 illustrated in FIG. 2. As a result, the evaluation computing unit 12 in this case can calculate the deposit existence probability for an evaluation target sea area by using the ocean topography data and the fine particle component measurement data for the evaluation target sea area and the measurement location data as inputs.

[1-4. Second Example]

The second example is an example in which the evaluation computing unit 12 calculates the estimated ore type by setting the ocean topography data, the fine particle component measurement data, and the measurement location data to be input data.

Also in the second example, the machine learning device 20 compatible with supervised learning is used.

In the second example, as the input data set for learning, only a learning data set for a deposit sea area is used. Specifically, ocean topography data and fine particle component measurement data of the deposit sea area, and measurement location data are used.

In the case of the second example, information indicating the type of ore existing in the deposit is used as training data to be provided to the machine learning device 20. Specifically, in a case where learning data for the deposit sea area as input data for learning is input, data indicating the type of ore that actually existed in the seabed deposit is provided as training data for the machine learning device 20.

Through machine learning using the learning data set for the deposit sea area as described above and the training data, the machine learning device 20 can generate an evaluation model using the ocean topography data, the fine particle component measurement data, and the measurement location data as inputs to obtain the estimated ore type as an output.

Here, in the first example and the second example described above, examples have been described in which the ocean topography data, the fine particle component measurement data, and the measurement location data are set to the input data in calculating the deposit existence probability and the estimated ore type; however, the deposit existence probability and the estimated ore type can also be calculated on the basis of only the ocean topography data. In that case, as the machine learning for generating the evaluation model, only the ocean topography data is used as the input data set for learning in the learning method described above.

For the fine particle component measurement data, it is necessary to actually navigate to a predetermined sea area to perform measurement; however, for the ocean topography data, known topography data can be used. For this reason, if an evaluation based only on the ocean topography data is made as described above, it is possible not to conduct a survey or it is possible to conduct a survey with lower priority in the sea area where the deposit existence probability is low, and there is an advantage that the efficiency of the exploration can be improved.

Note that the evaluation device 1 can also be configured to calculate the hydrothermal plume probability as the deposit evaluation data, and an evaluation model generation method of a hydrothermal plume probability will be described in the following second embodiment.

2. Second Embodiment

In a second embodiment, navigation control for deposit exploration is performed on the basis of deposit evaluation data.

Hereinafter, as an example of navigation control, an example of performing navigation control of an autonomous underwater vehicle (AUV) will be described.

Note that, for confirmation, in the present Description, the term "navigation" is used as a broad term including not only movement over water but also movement under water.

Figure 4:
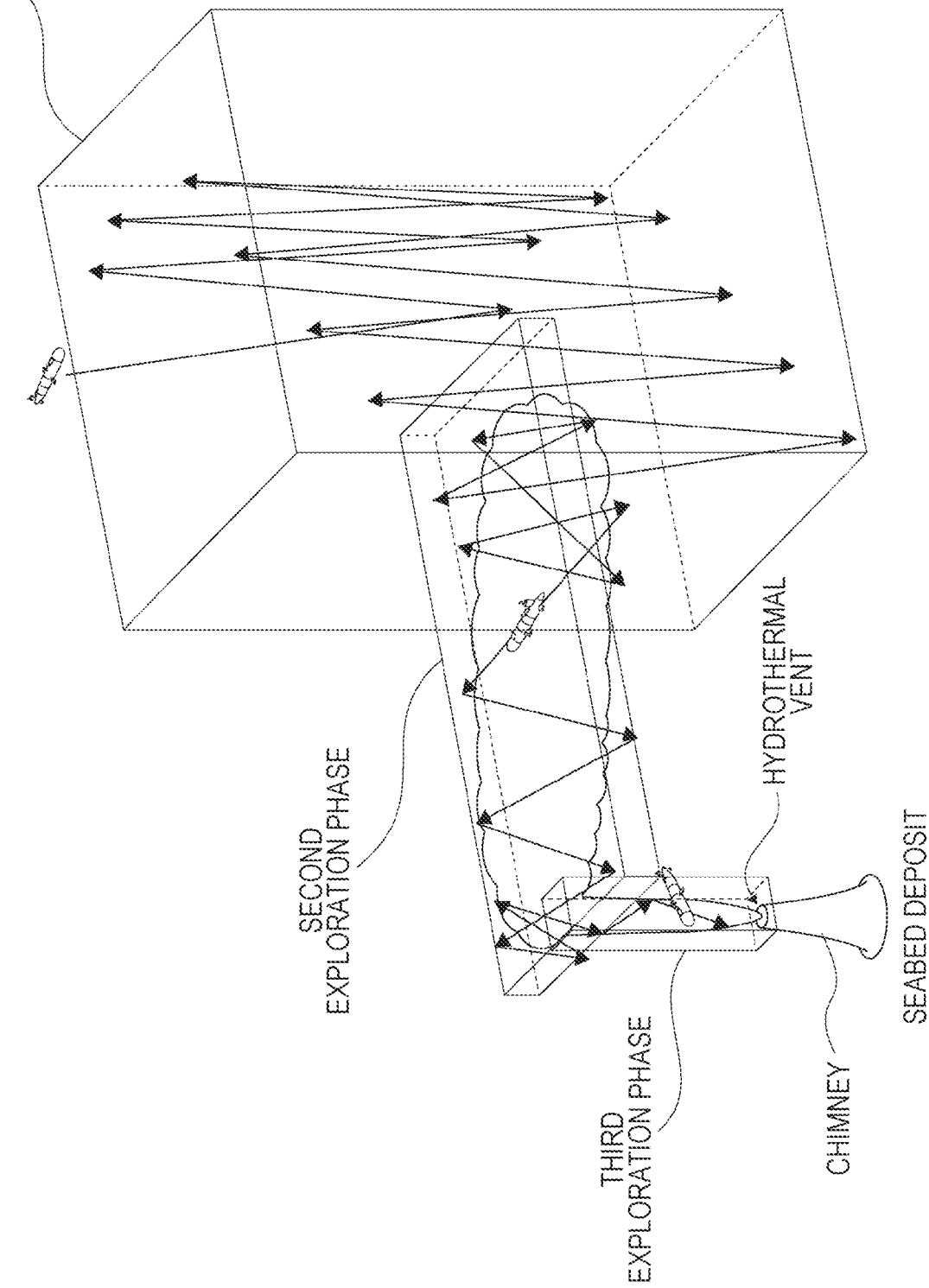
FIG. 4 is a schematic view of deposit exploration in a second embodiment.

FIG. 4 is a schematic view of deposit exploration in the second embodiment.

The deposit exploration here is performed in a mode in which navigation control is performed by using a non-buoyant plume probability and a buoyant plume probability as hydrothermal plume probabilities as indices of control, and the position of a seabed deposit is specified. Specifically, the deposit exploration in this case is realized by stepwise navigation control according to values of the non-buoyant plume probability and the buoyant plume probability, and a search divided into a first search phase, a second search phase, and a third search phase as illustrated in the drawing is performed.

The first search phase is a search phase for searching for a non-buoyant plume, and is a search phase for performing navigation control looking for a non-buoyant plume probability exceeding a predetermined value.

The second search phase is a search phase for performing navigation control looking for a buoyant plume probability exceeding a predetermined value after the non-buoyant plume probability exceeds the predetermined value.

The third search phase is a search phase for performing navigation control aiming at recognizing a hydrothermal vent after the buoyant plume probability exceeds the predetermined value.

In the present example, navigation control for exploration is performed on the basis of the result of performing action learning from an action taken by the AUV itself in the past and the result thereof. Reinforcement learning is used for this action learning.

Hereinafter, a method for deriving an optimal action in a case where Q-learning is adopted as reinforcement learning will be described.

Q-learning is one of machine learning methods for learning an action for "maximizing reward (score) obtained from now on" from trial and error. In order to control the AUV and guide the AUV to a deposit by using the concept of Q-learning, machine learning is performed in which trial and error and learning are automatically performed so that the Q-value, which is the action evaluation value of the AUV, becomes the highest.

The Q-value is defined by Q ($S_t$, $a_t$) as a value function when an action $a_t$ that becomes a state $S_t$ is taken at time t.

The following [Expression 1] is a mathematical model of Q-learning.

[Mathematical Expression 1]

$$Q(S_t, a_t) \leftarrow Q(S_t, a_t) + \alpha \left[ R_{t+1} + \gamma \max_a Q(S_{t+1}, a) - Q(S_t, a_t) \right] \quad \text{[Expression 1]}$$

In [Expression 1], the state $S_t$ represents state information (deposit existence probability) at the time t, and the action $a_t$ represents control data (navigation control information) of the AUV as an action at the time t. The state changes to $S_{t+1}$ by a change of the control data of the AUV, that is, change of the action $a_t$. $R_{t+1}$ represents a reward obtained by this change in the state. Furthermore, maxQ ($S_{t+1}$, a) of the second term at the right side represents a future ideal value. The Q-value in a case where the ideal action a in the future having the highest Q-value under the state $S_{t+1}$ is selected, is multiplied by a discount factor γ. Here, γ is a parameter of $0 < \gamma \leq 1$, and 0.9 to 0.99 is used in many cases. Furthermore, a is a learning coefficient and is in a range of $0 < \alpha \leq 1$, and a value of about 0.1 is usually used.

As described above, in the state $S_t$ of the AUV, the function having the highest Q value when the change $a_t$ of the AUV control data by machine learning device is taken is set as the value function (Q-function), and the value function is repeatedly updated so that the Q-value becomes high.

Figure 5:
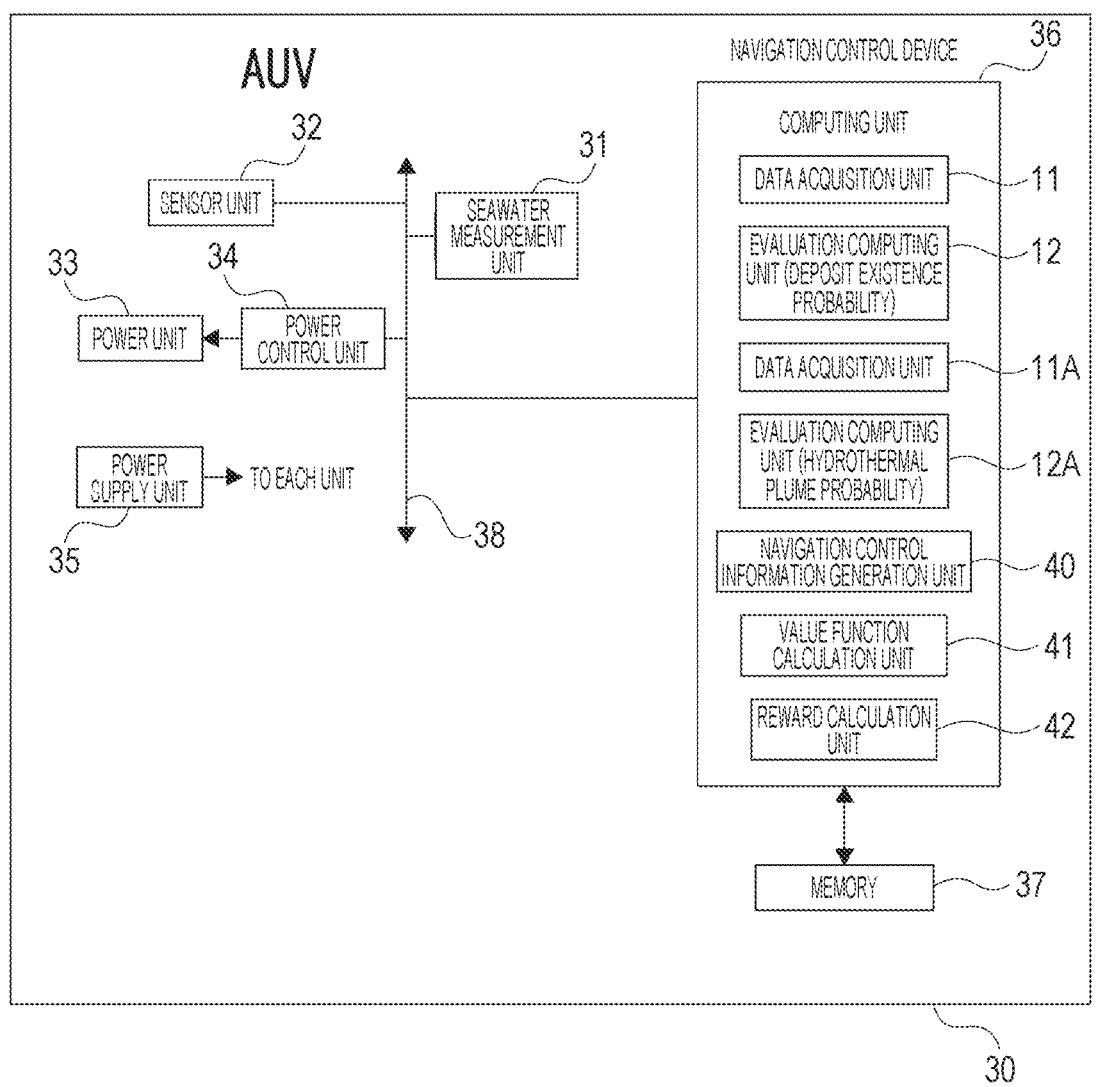
FIG. 5 is a diagram illustrating an internal configuration example of a navigation control device as the second embodiment.

FIG. 5 is a diagram illustrating an internal configuration example of the AUV 30 that performs automatic navigation by using the action learning function as described above.

Note that in the following description, the same reference numerals are given to portions similar to those already described, and description thereof is omitted.

As illustrated, the AUV 30 includes a seawater measurement unit 31, a sensor unit 32, a power unit 33, a power control unit 34, a power supply unit 35, a computing unit 36, a memory 37, and a bus 38. The seawater measurement unit 31, the sensor unit 32, the power control unit 34, and the computing unit 36 are connected to the bus 38 and can perform data communication with one another.

The seawater measurement unit 31 has a configuration of including various sensors for measuring seawater, a microcomputer, and the like. Specifically, the seawater measurement unit 31 includes an imaging sensor (imaging element) as a sensor for performing measurement regarding microorganisms. The seawater measurement unit 31 is configured to take seawater into a flow cell as a sample, and the imaging sensor can obtain a captured image of microorganisms by imaging the seawater taken into the flow cell. On the basis of this captured image, the seawater measurement unit 31 can obtain the microorganism data described above. Specifically, the microorganism data is data such as the number, type, size, and the like of the microorganisms. Here, detection of microorganisms and recognition of the type thereof can be performed on the basis of image analysis of the captured image. For example, detection of microorganisms and recognition of the type thereof can be performed by image matching using a template image of microorganisms, or the like.

Furthermore, the seawater measurement unit 31 also includes various sensors for measuring the water quality data described above. Examples of the various sensors include a sensor for measuring electrical conductivity, temperature, pH, gas concentrations of specific gases such as methane, hydrogen, helium, and the like, and metal concentrations of specific metals such as manganese, iron, and the like.

Note that as the seawater measurement unit 31, it is also possible to use an in-situ type measuring machine that does not include a flow cell and directly images seawater.

The sensor unit 32 comprehensively represents a sensor for detecting the position of the AUV 30 and a sensor for recognizing the external environment of the AUV 30. Here, regarding the position information, it is conceivable to provide a global navigation satellite system (GNSS) sensor that detects latitude and longitude information and a sensor that detects water depth information.

Furthermore, as a sensor for recognizing the external environment, for example, a camera (image sensor) or the like can be provided.

The power unit 33 comprehensively represents a portion that generates power for navigation. Examples thereof include a motor for driving a screw for propulsion, an actuator for adjusting a propulsion direction, and the like.

The power control unit 34 controls the power unit 33 on the basis of navigation control information.

The power supply unit 35 includes, for example, a battery, and supplies power to each unit of the AUV 30.

The computing unit 36 has a configuration of including a microcomputer including, for example, a CPU, a ROM, and a RAM, and performs various computations and control for realizing various operations of the AUV 30.

The memory 37 is configured as a nonvolatile storage device such as a solid state drive (SSD), a hard disk drive (HDD), or the like, and is used as a storage area of data used by the computing unit 36 in various processes.

Here, the computing unit 36 has functions as the data acquisition unit 11 and the evaluation computing unit 12 as described above. In this case, similarly to that described as the first example of the first embodiment, the evaluation computing unit 12 that learns to output a deposit existence probability by using ocean topography data, fine particle component measurement data, and measurement location data as inputs is used. As the ocean topography data, for example, data stored in the memory 37 is used. Specifically, the data acquisition unit 11 in this case acquires ocean topography data of the sea area corresponding to information of the position of the AUV 30 detected by the sensor unit 32 as input data of the ocean topography data to the evaluation computing unit 12, and supplies the acquired data to the evaluation computing unit 12.

Furthermore, regarding the fine particle component measurement data, the data acquisition unit 11 in this case acquires measurement data obtained by the seawater measurement unit 31, and supplies the measurement data to the evaluation computing unit 12.

In addition, the computing unit 36 has functions as a data acquisition unit 11A and an evaluation computing unit 12A.

The evaluation computing unit 12A has an evaluation model learned to calculate a hydrothermal plume probability. Specifically, the evaluation computing unit 12A in the present example learns to calculate the non-buoyant plume probability and the buoyant plume probability as described above by using fine particle component measurement data and measurement location data as inputs.

Here, in individually calculating the non-buoyant plume probability and the buoyant plume probability, an evaluation model for the non-buoyant plume probability and an evaluation model for the buoyant plume probability are separately provided; however, here, in order to avoid complication of illustration, these evaluation models are collectively treated as the evaluation computing unit 12A.

Figure 6:
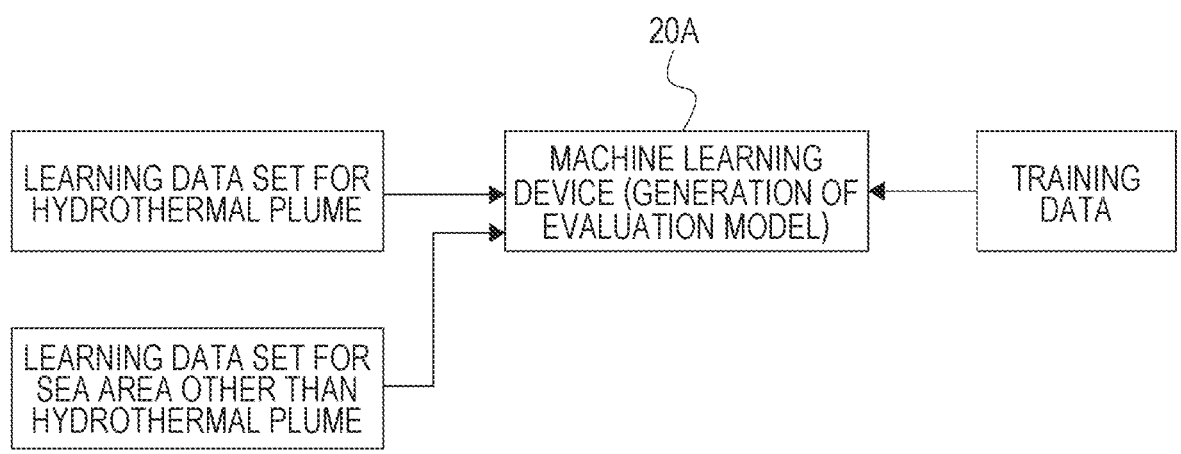
FIG. 6 is a diagram for describing an example of a machine learning method for generating an evaluation model for a hydrothermal plume probability.

An example of the machine learning method for generating an evaluation model for the hydrothermal plume probability will be described with reference to FIG. 6.

A machine learning device 20A is used to generate the evaluation model in this case. Also as the machine learning device 20A, similarly to the machine learning device 20, one having a machine learning engine that handles a known supervised regression problem such as a learning engine of logistic regression is used.

As an input data set for learning, a learning data set for a hydrothermal plume and a learning data set for a sea area other than the hydrothermal plume are used. Specifically, in the case of generation of the evaluation model for the non-buoyant plume probability, fine particle component measurement data in the sea area as a non-buoyant plume and measurement location data are used as the learning data set for the hydrothermal plume, and fine particle component measurement data in the sea area other than the non-buoyant plume and the buoyant plume and measurement location data are used as the learning data set for the sea area other than the hydrothermal plume.

As the training data in this case, data indicating whether it is a hydrothermal plume or not is used. That is, in generation of the evaluation model for the non-buoyant plume probability, in a case where fine particle component measurement data in the sea area as a non-buoyant plume and measurement location data are used as input data for learning, data indicating that it is a non-buoyant plume (that is, the non-buoyant plume probability is 100) is given as training data for the machine learning device 20A, and in a case where fine particle component measurement data in the sea area other than a hydrothermal plume and measurement location data are used as input data for learning, data indicating that it is not a non-buoyant plume (non-buoyant plume probability is 0%) is given.

Furthermore, in generation of the evaluation model for the buoyant plume probability, in a case where fine particle component measurement data in the sea area as a buoyant plume and measurement location data are used as input data for learning, data indicating that it is a buoyant plume (that is, the buoyant plume probability is 100%) is given as training data for the machine learning device 20A, and in a case where fine particle component measurement data in the sea area other than a hydrothermal plume and measurement location data are used as input data for learning, data indicating that it is not a buoyant plume (buoyant plume probability is 0%) is given.

By performing machine learning by the machine learning device 20A using the learning data set and the training data as described above for each of the non-buoyant plume and the buoyant plume, it is possible to generate an evaluation model using ocean topography data and measurement location data as inputs to obtain a non-buoyant plume probability or a buoyant plume probability as an output.

In FIG. 5, the data acquisition unit 11A acquires input data of the evaluation computing unit 12A. Specifically, the data acquisition unit 11A of the present example acquires measurement data obtained by the seawater measurement unit 31 as fine particle component measurement data and supplies the measurement data to the evaluation computing unit 12, and acquires detection data obtained by the sensor unit 32 as measurement location data and supplies the detection data to the evaluation computing unit 12.

Furthermore, the computing unit 36 includes a navigation control information generation unit 40, a value function calculation unit 41, and a reward calculation unit 42 as functional units for the reinforcement learning described above.

The reward calculation unit 42 calculates a highest reward for an action (navigation control) that can be taken at that time, learned from the past under the current situation.

The value function calculation unit 41 calculates a value function (Q-value when navigation control as the action a is performed in the state $S_{t+1}$) in a case where a navigation control setting that is the basis of reward calculation is made.

The navigation control information generation unit 40 generates navigation control information with the maximum value function (Q-value) on the basis of the value function calculated (updated) by the value function calculation unit 41. Here, in the present example, the navigation control information is, for example, information related to control of the above-described propulsion motor or actuator for propulsion direction adjustment. The navigation control information generation unit 40 outputs the navigation control information that has been generated to the power control unit 34.

Here, in order to enable learning from the past data, the computing unit 36 performs processing of recording the value function calculated by the value function calculation unit 41, the Q-value obtained from the value function that has been calculated, the state S (deposit existence probability), and the action a (navigation control information) in the memory 37.

Figure 7:
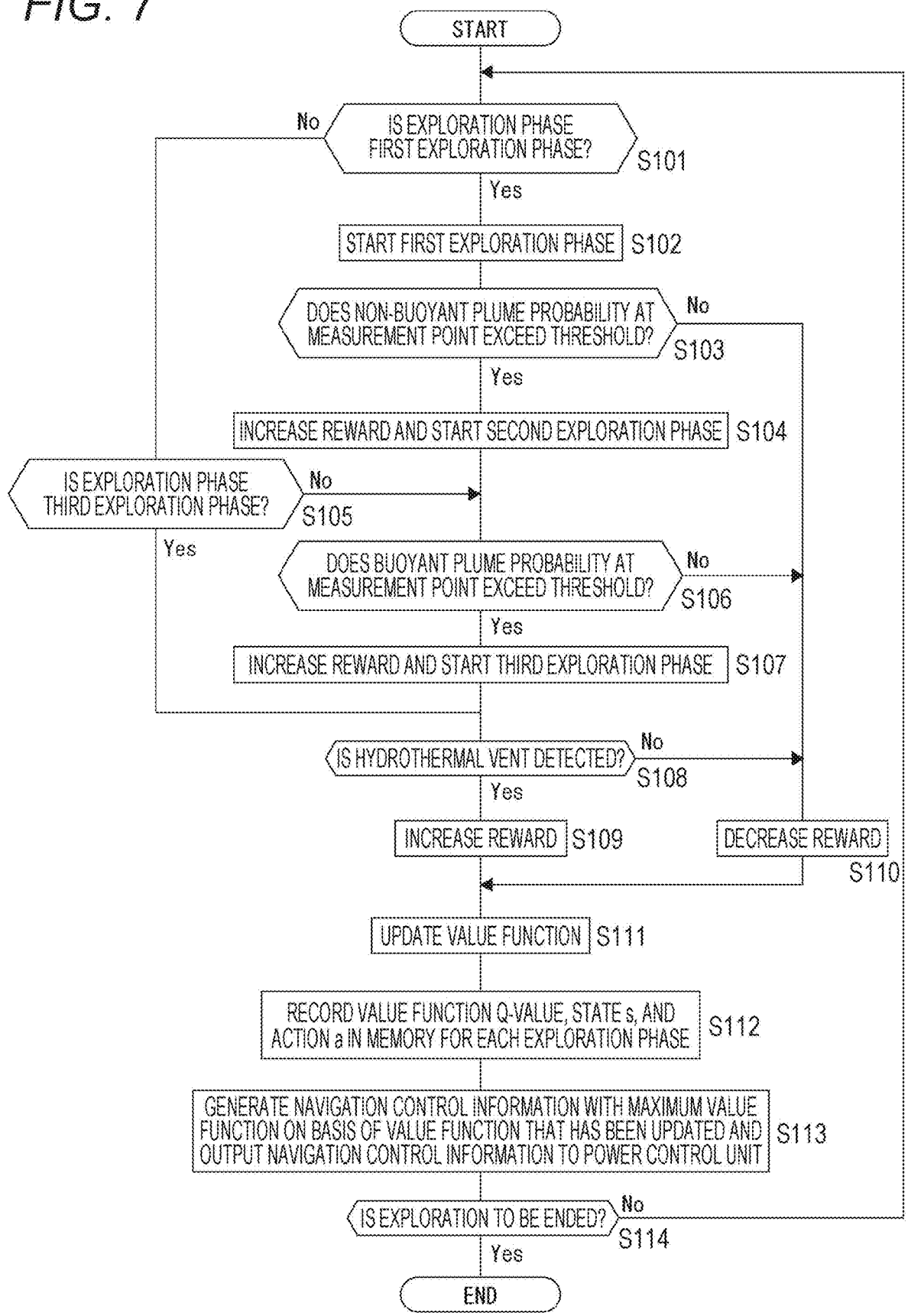
FIG. 7 is a flowchart illustrating a processing procedure for realizing navigation control as the second embodiment.

FIG. 7 is a flowchart illustrating a processing procedure for realizing navigation control as the second embodiment.

Note that the processing illustrated in FIG. 7 is executed by the computing unit 36 on the basis of a program stored in a storage device such as a built-in ROM, the memory 37, or the like.

First, in step S101, the computing unit 36 determines whether or not the exploration phase is a first exploration phase.

In a case where the exploration phase is the first exploration phase, the computing unit 36 proceeds to step S102 to start the first exploration phase, and further determines whether or not the non-buoyant plume probability at the measurement point exceeds a threshold in subsequent step S103. Specifically, in step S103, the computing unit 36 first causes the seawater measurement unit 31 to execute measurement operation to acquire fine particle component measurement data, and causes the sensor unit 32 to execute detection of the latitude and longitude and the water depth to acquire measurement location data. Then, the evaluation model for the non-buoyant plume probability is used to calculate the non-buoyant plume probability by using the fine particle component measurement data and the measurement location data as input data. It is determined whether or not the non-buoyant plume probability calculated in this manner exceeds the predetermined threshold.

In a case where it is determined in step S103 that the non-buoyant plume probability at the measurement point does not exceed the threshold, the computing unit 36 proceeds to step S110 to reduce the reward (R), and then proceeds to step S111 to update the value function. That is, by performing the processing as the reward calculation unit 42 and the value function calculation unit 41 as described above, a value function (Q-value when navigation control as the action a is performed in the state $S_{t+1}$) is calculated.

In calculation of this value function, in the present example, the deposit existence probability is used as the state S. As understood from the above description, the computing unit 36 calculates the deposit existence probability by processing as the evaluation computing unit 12 using, as input data, ocean topography data, fine particle component measurement data, and measurement location data acquired from the memory 37, the seawater measurement unit 31, and the sensor unit 32, respectively, by processing as the data acquisition unit 11.

In step S112 subsequent to step S111, the computing unit 36 performs processing of recording the value function Q-value, the state S, and the action a in the memory 37 for each exploration phase. For each exploration phase here means for each of the first exploration phase, a second exploration phase, and a third exploration phase. The value function Q-value means a Q-value obtained from the value function that has been updated.

In step S113 subsequent to step S112, the computing unit 36 generates navigation control information with the maximum value function on the basis of the value function that has been updated and outputs the navigation control information to the power control unit 34.

In step S114 subsequent to step S113, the computing unit 36 determines whether or not to end the exploration. That is, it is determined whether or not a predetermined condition set in advance as an exploration end condition is satisfied.

In a case where it is determined that the exploration end condition is not satisfied and the exploration is not to be ended, the computing unit 36 returns to step S101. As a result, during the first exploration phase (situation in which the non-buoyant plume probability does not exceed the threshold), unless it is determined in step S114 that the exploration is to be ended, the processing in steps S110, S111, S112, and S113 described above are repeated, and navigation control during the first exploration phase is realized.

In a case where it is determined in step S103 that the non-buoyant plume probability at the measurement point exceeds the threshold, the computing unit 36 proceeds to step S104 to increase the reward (R), and then starts the second exploration phase.

In response to start of the second exploration phase in step S104, the computing unit 36 proceeds to step S106 and determines whether or not the buoyant plume probability at the measurement point exceeds a threshold. That is, in step S106, the computing unit 36 first causes the seawater measurement unit 31 to execute measurement operation to acquire fine particle component measurement data, and causes the sensor unit 32 to execute detection of the latitude and longitude and the water depth to acquire measurement location data. Then, the evaluation model for the buoyant plume probability is used to calculate the buoyant plume probability by using the fine particle component measurement data and the measurement location data as input data, and it is determined whether or not the buoyant plume probability that has been calculated exceeds the predetermined threshold.

In a case where it is determined in step S106 that the buoyant plume probability at the measurement point does not exceed the threshold, the computing unit 36 proceeds to step S110 to reduce the reward. Note that, since the flow of the processing in step S110 and thereafter has been described above, redundant description is avoided.

Here, in a case where it is determined in step S101 that the exploration phase is not the first exploration phase, the computing unit 36 proceeds to step S105 and determines whether or not the search phase is the third exploration phase. In a case where it is determined that the search phase is not the third exploration phase (that is, in a case where the exploration phase is the second exploration phase), the computing unit 36 advances the processing to step S106.

As a result, during the second exploration phase (situation in which the buoyant plume probability does not exceed the threshold), unless it is determined in step S114 that the exploration is to be ended, the processing in steps S110, S111, S112, and S113 described above are repeated, and navigation control during the second exploration phase is realized.

In a case where it is determined in step S106 that the buoyant plume probability at the measurement point exceeds the threshold, the computing unit 36 proceeds to step S107 to increase the reward, and then starts the third exploration phase.

Then, in step S108 subsequent to step S107, the computing unit 36 determines whether or not a hydrothermal vent is detected. This determination can be made by image analysis of the image captured by the camera in the sensor unit 32. Note that the detection target in step S108 is not limited to a hydrothermal vent hole, and it is sufficient if part of the deposit such as part of the chimney or the like is a detection target.

In step 3108, in a case where it is determined that a hydrothermal vent is not detected, the computing unit 36 proceeds to step S110.

Here, in a case where it is determined in aforementioned step S105 that the search phase is the third exploration phase, the computing unit 36 advances the processing to step S108. As a result, during the third exploration phase (situation in which a hydrothermal vent is not detected), unless it is determined in step S114 that the exploration is to be ended, the processing in steps S110, S111, S112, and S113 are repeated, and navigation control during the third exploration phase is realized.

Note that in a case where it is determined in step S108 that a hydrothermal vent is detected, the computing unit 36 increases the reward in step S109 and then advances the processing to step S111.

Furthermore, the computing unit 36 ends the series of processes illustrated in FIG. 7 in response to the determination to end the exploration in step S114.

3. Modifications

[3-1. First Modification]

Here, the embodiments are not limited to the specific examples described above, and configurations as various modifications can be adopted.

For example, in the second embodiment, an example has been described in which the non-buoyant plume probability and the buoyant plume probability are used as indices of exploration phase switching to perform navigation control divided into a plurality of exploration phases. However, it is not essential to explicitly divide the exploration phase.

Figure 8:
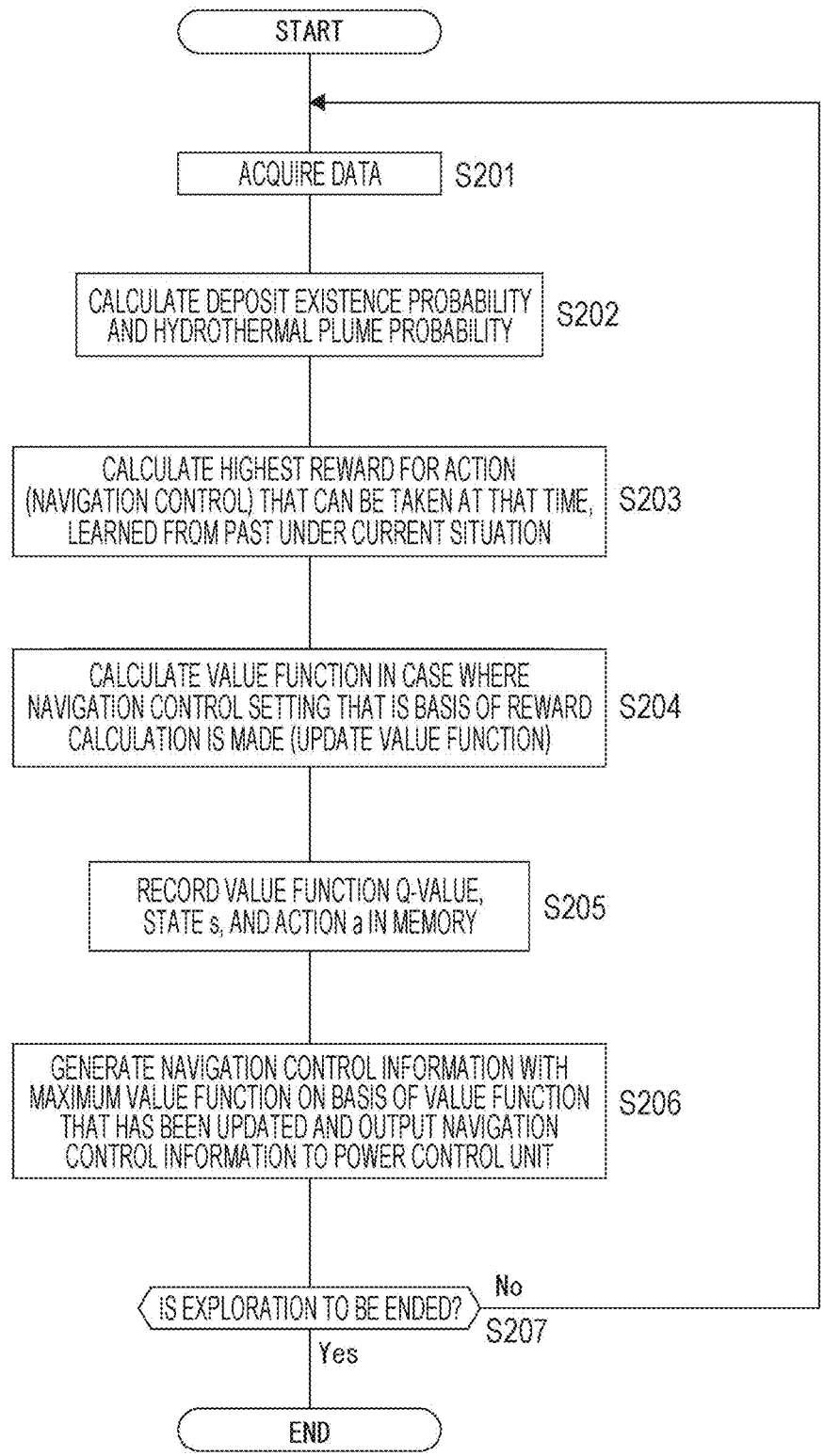
FIG. 8 is a flowchart illustrating a processing example of navigation control as a first modification.

FIG. 8 is a flowchart illustrating a processing example of navigation control corresponding to a case where the exploration phase is not explicitly divided.

Note that, in the example of FIG. 7 above, an example of using only the deposit existence probability as the state S in the value function has been described.

However, FIG. 8 illustrates an example of using the deposit existence probability and the hydrothermal plume probability as the state S. In this case, the value of the state S is a value reflecting both the deposit existence probability and the hydrothermal plume probability such as an average value of the deposit existence probability and the hydrothermal plume probability or the like.

In this case, the computing unit 36 performs processing of acquiring input data of the evaluation computing units 12 and 12A for calculating the deposit existence probability and the hydrothermal plume probability, respectively, as the data acquisition process of step S201. Specifically, as in the present example, in a case where the deposit existence probability is calculated by using ocean topography data, fine particle component measurement data, and measurement location data as inputs and the hydrothermal plume probability is calculated by using the fine particle component measurement data and the measurement location data as inputs, the ocean topography data, the fine particle component measurement data, and the measurement location data are acquired.

Then, in step S202 subsequent to step S201, the computing unit 36 calculates the deposit existence probability and the hydrothermal plume probability by using the evaluation models as the evaluation computing units 12 and 12A on the basis of the acquired data.

The processing of steps S203 to S205 subsequent to step S202 is processing related to reinforcement learning by Q-learning. Specifically, in step S203, the computing unit 36 calculates the highest reward for an action (navigation control) that can be taken at that time, learned from the past under the current situation, and in subsequent step S204, the computing unit 36 calculates the value function in a case where navigation control setting that is the basis of the reward calculation is made (update of the value function). That is, the Q-value obtained when the navigation control as the action a is performed in the state $S_{t+1}$ is calculated.

Then, in step S205 subsequent to step S204, the computing unit 36 performs processing of recording the value function Q-value, the state S, and the action a in the memory 37.

In step S206 subsequent to step S205, the computing unit 36 generates navigation control information with the maximum value function on the basis of the value function that has been updated and outputs the navigation control information to the power control unit 34.

Moreover, in step S207 subsequent to step S206, the computing unit 36 determines whether or not to end the exploration (determines whether or not the exploration end condition is satisfied similarly to aforementioned step S114), and returns to step S201 in the case of determining not to end the exploration.

In contrast, in a case where it is determined in step S207 that the exploration is to be ended, the computing unit 36 ends the series of processes illustrated in FIG. 8.

[3-2. Second Modification]

A second modification is a modification related to a configuration for deposit exploration.

Figure 9:
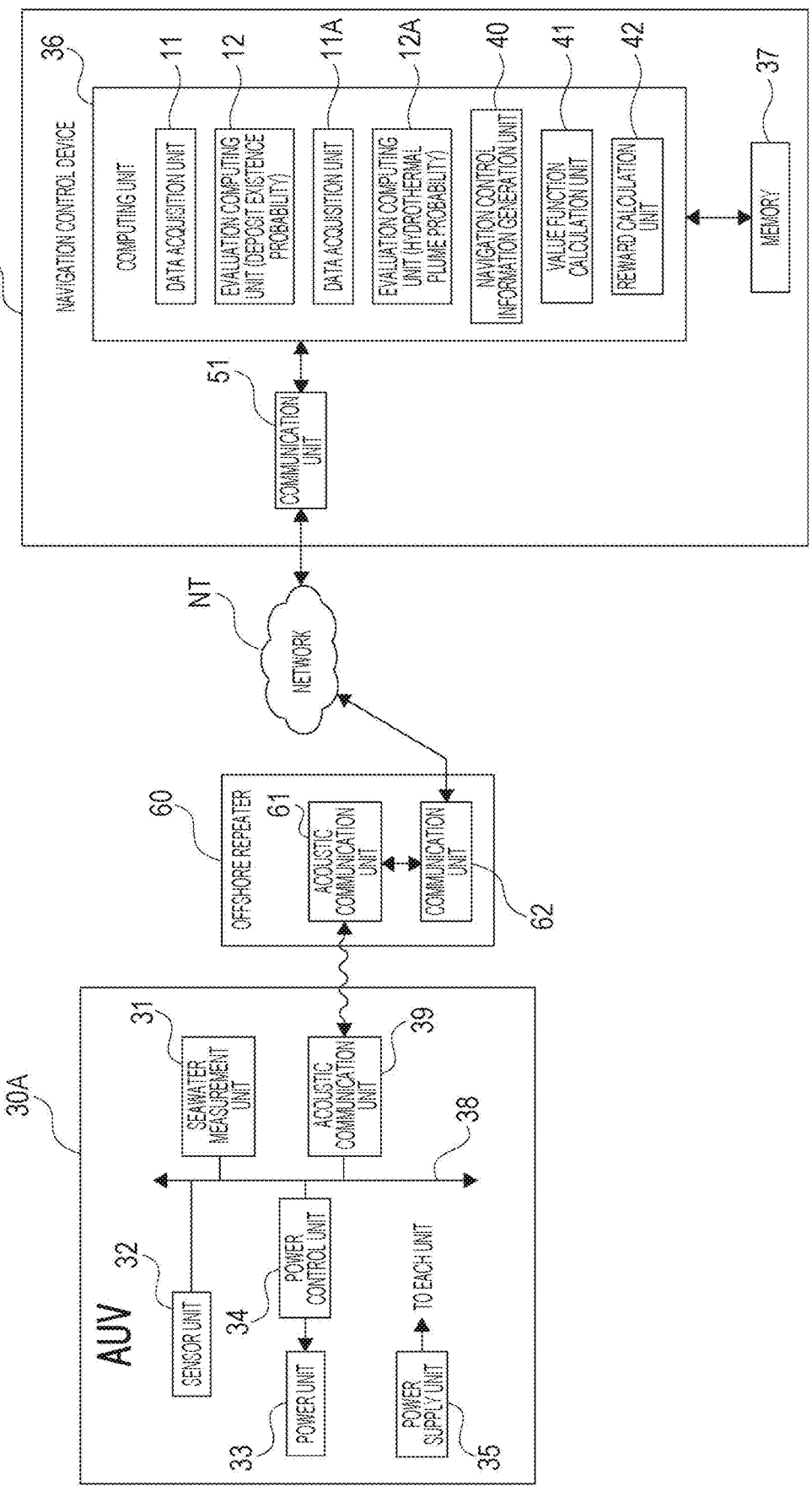
FIG. 9 is a diagram illustrating a configuration example of a deposit exploration system as a second modification.

FIG. 9 is a diagram illustrating a configuration example of a deposit exploration system as the second modification.

As illustrated in the drawing, the deposit exploration system as the second modification includes at least an AUV 30A, a navigation control device 50, and an offshore repeater 60. It can be said that in this deposit exploration system, each function of the computing unit 36 included in the AUV 30 illustrated in FIG. 5 is relocated to the external navigation control device 50.

The AUV 30A is different from the AUV 30 in that the computing unit 36 is omitted and an acoustic communication unit 39 for enabling communication in the sea is provided.

The navigation control device 50 includes a communication unit 51 in addition to the computing unit 36 and the memory 37. It is conceivable that the navigation control device 50 is disposed, for example, on a vessel navigating on the ocean or on the ground.

The offshore repeater 60 is disposed on the sea and includes an acoustic communication unit 61 and a communication unit 62. The communication unit 62 performs data communication with the communication unit 51 in the navigation control device 50 via a network NT, which is a communication network such as the Internet, a local area network (LAN), a satellite communication network, or the like.

With such a configuration, the computing unit 36 in the navigation control device 50 can acquire, from the AUV 30A, data such as fine particle component measurement data required for generating navigation control information by the reinforcement learning described above, and furthermore can output the navigation control information that has been generated to the AUV 30A to perform navigation control of the AUV 30A.

Figure 10:
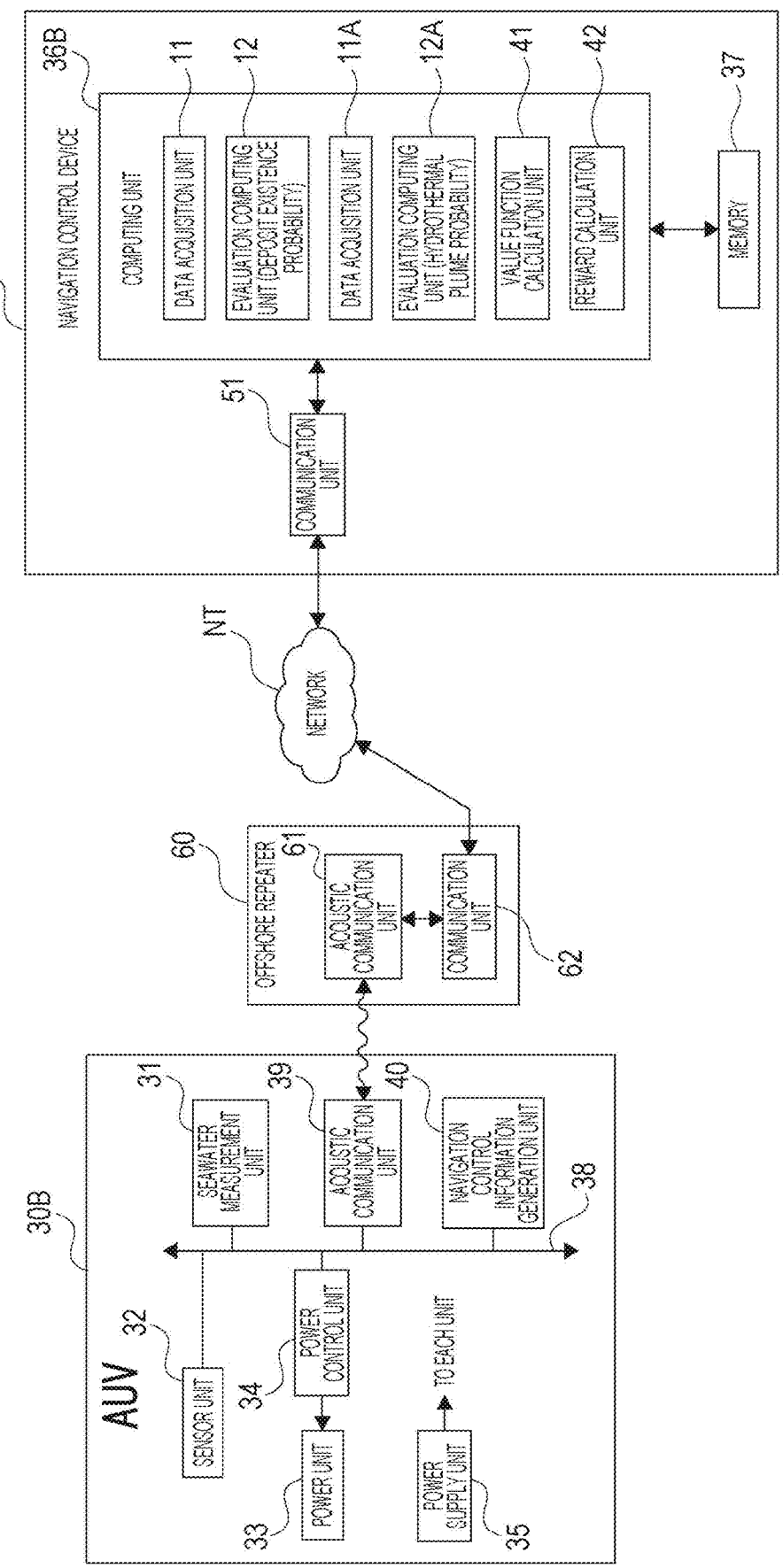
FIG. 10 is a diagram illustrating another configuration example of the deposit exploration system.

Note that, in the navigation control system illustrated in FIG. 9, the navigation control information generation unit 40 can also be provided on an AUV 30B side as illustrated in FIG. 10. An AUV 30B is different from the AUV 30A in that the navigation control information generation unit 40 is connected to the bus 38. In FIG. 10, the computing unit 36 from which the navigation control information generation unit 40 is omitted is denoted as a computing unit 36B, and the navigation control device 50 provided with the computing unit 36B instead of the computing unit 36 is denoted as a navigation control device 50B.

[3-3. Other Modifications]

In the above description, an example has been described in which the evaluation model for the hydrothermal plume probability is generated by machine learning using only fine particle component measurement data and measurement location data; however, the evaluation model for the hydrothermal plume probability can also be generated by machine learning using fine particle component measurement data, measurement location data, and ocean topography data.

Furthermore, the AUV has been described above as an example of the navigation device used for deposit exploration. However, as the navigation device, other device forms such as a remotely operated vehicle (ROV), a manned submersible, an underwater drone, a water drone, an underwater glider, a towing navigation device, a research vessel, and the like can be adopted.

Furthermore, depending on the type of seabed deposit, there may be a case where habitat data of microorganisms and characteristic seawater component data estimated to be related to deposits are measured even though there is no water mass like a hydrothermal plume. As a result of learning based on data measured in such a sea area, it is also assumed that only the deposit existence probability is a high value even though the hydrothermal plume probability is low.

In such a case, in both the first and second embodiments, only the deposit existence probability is used as reference data for exploration or reference data for navigation control in some cases.

4. Summary of Embodiments

As described, the evaluation device (1, AUV 30, navigation control device 50, 50B) according to an embodiment includes the evaluation computing unit (12, 12A) that learns to obtain deposit evaluation data as an output by machine learning using at least one of ocean topography data or fine particle component measurement data for a known seabed deposit as input data for learning, the evaluation computing unit calculating the deposit evaluation data for an evaluation target sea area by using at least one of the ocean topography data or the fine particle component measurement data for the evaluation target sea area as an input.

According to the above configuration, it is possible to improve evaluation accuracy by using artificial intelligence (AI) as a computing unit for making an evaluation regarding a seabed deposit.

Therefore, it is possible to improve the efficiency of deposit exploration and to reduce cost related to the deposit exploration.

Furthermore, by causing the evaluation computing unit as described above to calculate deposit evaluation data, it is possible to realize a survey with less risk of environmental destruction in place of an acoustic survey in evaluating a deposit in an evaluation target sea area.

Therefore, the risk of environmental destruction can be reduced.

Here, it has been understood that conducting research for environmental impact assessment in a sea area to be developed before and after development of seabed resources in order to achieve both the development of seabed resources and environmental conservation will be an international standardization rule in the future. It has been considered to conduct environment assessment by measuring the habitat situation of microorganisms such as plankton as an index of environment assessment and comparing the habitat situation before and after resource development. In the present technology, in a case where fine particle component measurement data is used as input data for calculating deposit evaluation data, measurement of microorganisms has not only an advantage that it is a resource exploration method with a low risk of environmental destruction, but also has a large efficient and cost advantage that it can also serve as measurement of the environment assessment described above performed at the time of resource development.

Furthermore, in the evaluation device as an embodiment, the evaluation computing unit (12) learns to output the deposit existence probability as the deposit evaluation data.

As a result, in the case of evaluating the deposit existence probability in the evaluation target sea area, it is possible to improve evaluation accuracy. Furthermore, in evaluating the deposit existence probability, a survey with less risk of environmental destruction in place of an acoustic survey is realized.

Therefore, it is possible to reduce the risk of environmental destruction while improving the efficiency of deposit exploration.

In addition, the deposit existence probability can be used as an evaluation index for an action taken in deposit exploration.

Therefore, an output of the evaluation computing unit can be used as an action evaluation index in deposit exploration, which can contribute to improvement of the efficiency of exploration.

Moreover, in the evaluation device as an embodiment, the evaluation computing unit (12A) is configured to learn to output a hydrothermal plume probability as the deposit evaluation data by machine learning using at least fine particle component measurement data for a known seabed deposit as input data for learning.

The hydrothermal plume probability can be used as an evaluation index for an action taken in deposit exploration.

Therefore, an output of the evaluation computing unit can be used as an action evaluation index in deposit exploration, which can contribute to improvement of the efficiency of exploration.

Furthermore, in the evaluation device as an embodiment, the evaluation computing unit learns to output a non-buoyant plume probability as the hydrothermal plume probability.

The non-buoyant plume probability can be used as an evaluation index for an action taken in deposit exploration.

Therefore, an output of the evaluation computing unit can be used as an action evaluation index, which can contribute to improvement of the efficiency of exploration.

Furthermore, in the evaluation device as an embodiment, the evaluation computing unit learns to output a buoyant plume probability as the hydrothermal plume probability.

The buoyant plume probability can be used as an evaluation index for an action taken in deposit exploration.

Therefore, an output of the evaluation computing unit can be used as an action evaluation index, which can contribute to improvement of the efficiency of exploration.

Moreover, in the evaluation device as an embodiment, the evaluation computing unit learns to output deposit evaluation data by machine learning using ocean topography data and fine particle component measurement data for a known seabed deposit as input data for learning.

It is possible to improve the accuracy of deposit evaluation data by using learning based on a plurality of input elements regarding a seabed deposit.

Therefore, it is possible to improve accuracy of the evaluation regarding a seabed deposit.

Furthermore, in the evaluation device as an embodiment, the evaluation computing unit learns to output a hydrothermal plume probability by machine learning using fine particle component measurement data for a known seabed deposit and measurement location data indicating a measurement point as input data for learning.

The accuracy of the hydrothermal plume probability can be improved by learning using not only the fine particle component measurement data but also the measurement location data in combination.

It is possible to improve accuracy of the evaluation regarding a seabed deposit.

Furthermore, the evaluation method as an embodiment is an evaluation method including calculating deposit evaluation data for an evaluation target sea area by inputting at least one of ocean topography data or fine particle component measurement data for the evaluation target sea area to an evaluation computing unit that learns to obtain the deposit evaluation data as an output by machine learning using at least one of ocean topography data or fine particle component measurement data for a known seabed deposit as input data for learning.

Also by such an evaluation method, it is possible to obtain similar operations and effects as those of the evaluation device as an embodiment described above.

The navigation control device (AUV 30, navigation control device 50) as an embodiment includes an evaluation computing unit (12, 12A) that learns to obtain deposit evaluation data as an output by machine learning using at least one of ocean topography data or fine particle component measurement data for a known seabed deposit as input data for learning, and a control information generation unit (navigation control information generation unit 40) that generates navigation control information which is control information regarding navigation on the basis of the deposit evaluation data for an evaluation target sea area output by the evaluation computing unit by using at least one of the ocean topography data or the fine particle component measurement data for the evaluation target sea area as an input.

As a result, in a case where navigation control information for deposit exploration is generated on the basis of deposit evaluation data, since AI is used as the computing unit for evaluation, it is possible to make a highly accurate evaluation as evaluation regarding a seabed deposit.

Therefore, improvement in accuracy of navigation control enables improvement in efficiency of deposit exploration and reduction of cost related to the deposit exploration.

Furthermore, according to the above configuration, it is possible to realize a survey with less risk of environmental destruction in place of an acoustic survey in calculating the deposit evaluation data.

Therefore, the risk of environmental destruction can be reduced.

Furthermore, in the navigation control device as an embodiment, the evaluation computing unit (12A) learns to output a hydrothermal plume probability as the deposit evaluation data by machine learning using at least fine particle component measurement data for a known seabed deposit as input data for learning, and the control information generation unit generates the navigation control information on the basis of the hydrothermal plume probability output by the evaluation computing unit by using at least the fine particle component measurement data for an evaluation target sea area as an input.

As a result, it is possible to generate navigation control information by using the hydrothermal plume probability as an action evaluation index in navigation.

Therefore, efficiency of deposit exploration can be improved.

Moreover, the navigation control device as an embodiment further includes as the evaluation computing unit, an evaluation computing unit that learns to output a non-buoyant plume probability and an evaluation computing unit that learns to output a buoyant plume probability, in which the control information generation unit generates the navigation control information for increasing the non-buoyant plume probability in a case where the non-buoyant plume probability is a predetermined value or less, and generates the navigation control information for increasing the buoyant plume probability in a case where the non-buoyant plume probability exceeds the predetermined value and the buoyant plume probability is a predetermined value or less.

As a result, it is possible to guide a device which is a navigation control target stepwise from the outside of a hydrothermal plume to the inside of a non-buoyant plume and from the inside of the non-buoyant plume to the inside of a buoyant plume.

Therefore, efficiency of deposit exploration can be improved.

Furthermore, in the navigation control device as an embodiment, the control information generation unit generates the navigation control information by reinforcement learning based on the deposit evaluation data.

As a result, it is possible to generate navigation control information for maximizing an evaluation value (reward) for an action.

Therefore, efficiency of deposit exploration can be improved.

Note that the effects described in the present Description are illustrations only and not limited, and may have other effects.

5. Present Technology

The present technology can also be configured as follows.

(1)

An evaluation device including: an evaluation computing unit that learns to obtain deposit evaluation data as an output by machine learning using at least one of ocean topography data or fine particle component measurement data for a known seabed deposit as input data for learning, the evaluation computing unit calculating the deposit evaluation data for an evaluation target sea area by using at least one of the ocean topography data or the fine particle component measurement data for the evaluation target sea area as an input.

(2)

The evaluation device according to the (1), in which the evaluation computing unit learns to output a deposit existence probability as the deposit evaluation data.

(3)

The evaluation device according to the (1) or (2), in which the evaluation computing unit learns to output a hydrothermal plume probability as the deposit evaluation data by machine learning using at least fine particle component measurement data for a known seabed deposit as input data for learning.

(4)

The evaluation device according to the (3), in which the evaluation computing unit learns to output a non-buoyant plume probability as the hydrothermal plume probability.

(5)

The evaluation device according to the (3), in which the evaluation computing unit learns to output a buoyant plume probability as the hydrothermal plume probability.

(6)

The evaluation device according to any one of the (1) to (5), in which the evaluation computing unit learns to obtain deposit evaluation data as an output by machine learning using ocean topography data and fine particle component measurement data for a known seabed deposit as input data for learning.

(7)

The evaluation device according to any one of the (3) to (6), in which the evaluation computing unit learns to output the hydrothermal plume probability by machine learning using fine particle component measurement data for a known seabed deposit and measurement location data indicating a measurement point as input data for learning.

(8)

An evaluation method including calculating deposit evaluation data for an evaluation target sea area by inputting at least one of ocean topography data or fine particle component measurement data for the evaluation target sea area to an evaluation computing unit that learns to obtain the deposit evaluation data as an output by machine learning using at least one of the ocean topography data or the fine particle component measurement data for a known seabed deposit as input data for learning.

(9)

A navigation control device including:

an evaluation computing unit that learns to obtain deposit evaluation data as an output by machine learning using at least one of ocean topography data or fine particle component measurement data for a known seabed deposit as input data for learning; and a control information generation unit that generates navigation control information which is control information regarding navigation on the basis of the deposit evaluation data for an evaluation target sea area output by the evaluation computing unit by using at least one of the ocean topography data or the fine particle component measurement data for the evaluation target sea area as an input.

(10)

The navigation control device according to the (9), in which the evaluation computing unit learns to output a hydrothermal plume probability as the deposit evaluation data by machine learning using at least fine particle component measurement data for a known seabed deposit as input data for learning, and the control information generation unit generates the navigation control information on the basis of the hydrothermal plume probability output by the evaluation computing unit by using at least the fine particle component measurement data for the evaluation target sea area as an input.

(11)

The navigation control device according to the (10) further including as the evaluation computing unit, an evaluation computing unit that learns to output a non-buoyant plume probability and an evaluation computing unit that learns to output a buoyant plume probability, in which the control information generation unit generates the navigation control information for increasing the non-buoyant plume probability in a case where the non-buoyant plume probability is a predetermined value or less, and generates the navigation control information for increasing the buoyant plume probability in a case where the non-buoyant plume probability exceeds the predetermined value and the buoyant plume probability is a predetermined value or less.

(12)

The navigation control device according to any one of the (9) to (11), in which the control information generation unit generates the navigation control information by reinforcement learning based on the deposit evaluation data.

REFERENCE SIGNS LIST

1 Evaluation device
2 Operation/display terminal
10 Computing unit 11, 11A Data acquisition unit
12, 12A Evaluation computing unit
15 Communication unit
20, 20A Machine learning device
30, 30A, 30B AUV
31 Seawater measurement unit
32 Sensor unit
33 Power unit
34 Power control unit
35 Power supply unit
36, 36B Computing unit
37 Memory
38 Bus
39, 61 Acoustic communication unit
40 Navigation control information generation unit
41 Value function calculation unit
42 Reward calculation unit
50, 50B Navigation control device
51, 62 Communication unit
60 Offshore repeater
NT Network

The invention claimed is:

1. An evaluation device comprising circuitry that compares reference data to measurement data to generate a probability of an existence of a seabed deposit,
wherein the reference data is generated by machine learning,
wherein the reference data comprises reference location data for a known seabed deposit and reference fine particle component measurement data for the known seabed deposit,
wherein the measurement data comprises evaluation location data for a seabed deposit search area and evaluation fine particle component measurement data for the seabed deposit search area,
wherein the reference fine particle component measurement data comprises measurement data regarding microorganisms from the known seabed deposit,
wherein the evaluation fine particle component measurement data comprises measurement data regarding microorganisms from the seabed deposit search area, and
wherein the circuitry outputs the generated probability of the existence of the seabed deposit as navigation information.

2. The evaluation device according to claim 1,
wherein the reference data further comprises reference ocean topography data for the known seabed deposit, and
wherein the measurement data further comprises evaluation ocean topography data for the seabed deposit search area.

3. The evaluation device according to claim 1, wherein the generated probability of the existence of the seabed deposit comprises a probability of an existence of a hydrothermal plume.

4. The evaluation device according to claim 3, wherein the probability of the existence of the hydrothermal plume comprises at least one of a probability of an existence of a non-buoyant plume probability or a probability of an existence of a buoyant plume probability.

5. The evaluation device according to claim 1,
wherein the reference fine particle component measurement data further comprises measurement data regarding a quality of seawater from the known seabed deposit, and
wherein the evaluation fine particle component measurement data further comprises measurement data regarding a quality of seawater from the seabed deposit search area.

6. The evaluation device according to claim 5,
wherein the measure measurement data regarding the quality of the seawater from the known seabed deposit comprises at least one of a gas concentration of a predetermined gas, a pH, a temperature, a concentration of a predetermined metal, or an electrical conductivity of the seawater from the known seabed deposit, and
wherein the measurement data regarding the quality of the seawater from the seabed deposit search area comprises at least one of a gas concentration of a predetermined gas, a pH, a temperature, a concentration of a predetermined metal, or an electrical conductivity of the seawater from the seabed deposit search area.

7. The evaluation device according to claim 1,
wherein the measurement data regarding microorganisms from the known seabed deposit comprises a number, type and size of the microorganisms from the known seabed deposit, and
wherein the measurement data regarding microorganisms from the seabed deposit search area comprises a number, type and size of the microorganisms from the seabed deposit search area.

8. A navigation control device comprising:
the evaluation device of claim 1; and
control circuitry that generates navigation control information based on the navigation information output from evaluation device.

9. An evaluation method performed by circuitry of an evaluation device, the evaluation method comprising:
performing a comparison of reference data to measurement data;
based on the comparison, generating a probability of an existence of a seabed deposit,
wherein the reference data is generated by machine learning,
wherein the reference data comprises reference location data for a known seabed deposit and reference fine particle component measurement data for the known seabed deposit,
wherein the measurement data comprises evaluation location data for a seabed deposit search area and evaluation fine particle component measurement data for the seabed deposit search area,
wherein the reference fine particle component measurement data comprises measurement data regarding microorganisms from the known seabed deposit,
wherein the evaluation fine particle component measurement data comprises measurement data regarding microorganisms from the seabed deposit search area; and
outputting the generated probability of the existence of the seabed deposit to a shipborne navigation device.

10. The evaluation method of claim 9,
wherein the reference data further comprises reference ocean topography data for the known seabed deposit, and
wherein the measurement data further comprises evaluation ocean topography data for the seabed deposit search area.

* * * * *